(12) United States Patent
Sadovsky et al.

(10) Patent No.: US 9,552,273 B2
(45) Date of Patent: *Jan. 24, 2017

(54) HEALTH REPORTING FROM NON-VOLATILE BLOCK STORAGE DEVICE TO PROCESSING DEVICE

(71) Applicant: Microsoft Technology Licensing, LLC, Redmond, WA (US)

(72) Inventors: Vladimir Sadovsky, Redmond, WA (US); Nathan Steven Obr, Seattle, WA (US); James C. Bovee, Redmond, WA (US); Robin A. Alexander, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/993,558

(22) Filed: Jan. 12, 2016

(65) Prior Publication Data

US 2016/0124831 A1    May 5, 2016

Related U.S. Application Data

(63) Continuation of application No. 14/461,315, filed on Aug. 15, 2014, now Pat. No. 9,286,211, which is a
(Continued)

(51) Int. Cl.
*G06F 11/34* (2006.01)
*G06F 12/14* (2006.01)
(Continued)

(52) U.S. Cl.
CPC ........... *G06F 11/3409* (2013.01); *G06F 3/061* (2013.01); *G06F 3/0616* (2013.01); *G06F 3/0653* (2013.01);
(Continued)

(58) Field of Classification Search
None
See application file for complete search history.

(56) References Cited

U.S. PATENT DOCUMENTS 6,658,202 B1   12/2003   Battaglia et al.
7,152,142 B1   12/2006   Guha et al.
(Continued)

FOREIGN PATENT DOCUMENTS

| CN | 101063962 A | 10/2007 |
|---|---|---|
| CN | 101078915 A | 11/2007 |
| JP | 2003022116 A | 1/2003 |

OTHER PUBLICATIONS

"AIO-168 Analog Input Alarm Module", Apr. 3, 2009, pp. 1-2.
"Fourth Office Action Issued in Chinese Patent Application No. 201080031586.8", Mailed Date: Jul. 1, 2015, 6 Pages.
"International Search Report", Mailed Date: Feb. 8, 2011, Application No. PCT/US2010/041016, Filed Date: Jul. 6, 2010, pp. 8.
(Continued)

*Primary Examiner* — Midys Rojas
(74) *Attorney, Agent, or Firm* — Sunah Lee; Judy Yee; Micky Minhas

(57) ABSTRACT

Methods and devices are provided for adapting an I/O pattern, with respect to a processing device using a non-volatile block storage device based on feedback from the non-volatile block storage device. The feedback may include information indicating a status of the non-volatile block storage device. In response to receiving the feedback, a storage subsystem, included in an operating system executing on processing device, may change a behavior with respect to the non-volatile block storage device in order to avoid, or reduce, a negative impact to the non-volatile block storage device or to enhance an aspect of the non-volatile block storage device. The feedback may include performance information and/or operating environmental information of the non-volatile block storage device. When the non-volatile block storage device is not capable of providing the feedback, the processing device may request information
(Continued)

about the non-volatile block storage device from a database service.

20 Claims, 5 Drawing Sheets

Related U.S. Application Data continuation of application No. 12/501,562, filed on Jul. 13, 2009, now Pat. No. 8,812,770.

(51) Int. Cl.
| | |
|---|---|
| *G06F 12/00* | (2006.01) |
| *G06F 3/06* | (2006.01) |
| *G06F 11/30* | (2006.01) |
| *G06F 12/02* | (2006.01) |

(52) U.S. Cl.
CPC ......... *G06F 3/0655* (2013.01); *G06F 3/0656* (2013.01); *G06F 3/0679* (2013.01); *G06F 11/3034* (2013.01); *G06F 11/3051* (2013.01); *G06F 11/3055* (2013.01); *G06F 11/3058* (2013.01); *G06F 12/00* (2013.01); *G06F 12/0246* (2013.01); *G06F 12/145* (2013.01); *G06F 2212/7202* (2013.01); *G06F 2212/7211* (2013.01)

(56) References Cited

U.S. PATENT DOCUMENTS

| | | | |
|---|---|---|---|
| 7,457,897 | B1 | 11/2008 | Lee et al. |
| 2003/0169733 | A1 | 9/2003 | Gurkowski et al. |
| 2005/0198298 | A1 | 9/2005 | Nishikawa et al. |
| 2006/0069886 | A1 | 3/2006 | Tulyani |
| 2007/0255860 | A1 | 11/2007 | Chen et al. |
| 2008/0104431 | A1 | 5/2008 | Shimada |
| 2008/0114935 | A1 | 5/2008 | Jeong |
| 2008/0172519 | A1 | 7/2008 | Shmulevich et al. |
| 2008/0263569 | A1 | 10/2008 | Shu et al. |
| 2009/0006786 | A1 | 1/2009 | Tanik |
| 2009/0055465 | A1 | 2/2009 | DePue et al. |
| 2011/0238900 | A1 | 9/2011 | Heo et al. |

OTHER PUBLICATIONS

"Second Office Action and Search Report Issued in Chinese Patent Application No. 201080031586.8", Mailed Date: Sep. 10, 2014, 24 Pages.
"Third Office Action Issued in Chinese Patent Application No. 201080031586.8", Mailed Date: Feb. 11, 2015, 8 Pages.
Chinese Office Action mailed Jan. 6, 2014 in CN Pat. App. No. 201080031586.8, 13 pages including Concise Explanation of Relevance and/or partial translation.
Extended European Search Report for European Patent Application No. 10800319.5, 6 pages, mailed Oct. 31, 2012.
Huffman, Amber, "Non-Volatile Memory Host Controller Interface (NVMHCI) 1.0", Apr. 14, 2008, pp. 1-65.
Thomas, et al., "Proposal for an Open Source SLC NAND Flash Failure Analysis Platform", The University of Utah, Nov. 12, 2007, pp. 1-10.
"Office Action Issued in Korean Patent Application No. 10-2012-7000900", Mailed Date: Mar. 16, 2016, 5 Pages.
"Final Office Action Issued in U.S. Appl. No. 12/501,562", Mailed Date: Sep. 14, 2012, 11 Pages.
"Final Office Action Issued in U.S. Appl. No. 12/501,562", Mailed Date: May 23, 2013, 12 Pages.
"Final Office Action Issued in U.S. Appl. No. 12/501,562", Mailed Date: Dec. 24, 2013, 13 Pages.
"Non-Final Office Action Issued in U.S. Appl. No. 12/501,562", Mailed Date: Jul. 25, 2013, 11 Pages.
"Non-Final Office Action Issued in U.S. Appl. No. 12/501,562", Mailed Date: Jan. 17, 2013, 12 Pages.
"Non-Final Office Action Issued in U.S. Appl. No. 12/501,562", Mailed Date: Feb. 17, 2012, 10 Pages.
"Notice of Allowance Issued in U.S Appl. No. 12/501,562", Mailed Date: Apr. 16, 2014, 9 Pages.
"Notice of Allowance Issued in U.S Appl. No. 12/501,562", Mailed Date: May 12, 2014, 7 Pages.
"Final Office Action Issued in U.S Appl. No. 14/461,315", Mailed Date: Aug. 13, 2015, 10 Pages.
"Non-Final Office Action Issued in U.S. Appl. No. 14/461,315", Mailed Date: Apr. 9, 2015, 8 Pages.
"Notice of Allowance Issued in U.S Appl. No. 14/461,315", Mailed Date: Nov. 24, 2015, 5 Pages.
"Notice of Allowance Issued in Chinese Patent Application No. 201080031586.8", Mailed Date: Aug. 5, 2015, 4 Pages.
"Notice of Allowance Issued in Korean Patent Application No. 10-2012-7000900", Mailed Date: Sep. 1, 2016, 2 Pages.

HEALTH REPORTING FROM NON-VOLATILE BLOCK STORAGE DEVICE TO PROCESSING DEVICE

CROSS-REFERENCE TO RELATED APPLICATION

This application is a continuation of U.S. patent application Ser. No. 14/461,315, filed Aug. 15, 2014, entitled "HEALTH REPORTING FROM NON-VOLATILE BLOCK STORAGE DEVICE TO PROCESSING DEVICE", which is a continuation of U.S. patent application Ser. No. 12/501,562, filed Jul. 13, 2009, now U.S. Pat. No. 8,812,770, issued Aug. 19, 2014, entitled "HEALTH REPORTING FROM NON-VOLATILE BLOCK STORAGE DEVICE TO PROCESSING DEVICE". The entirety of each of these afore-mentioned applications is incorporated herein by reference.

BACKGROUND

Non-volatile storage devices are sensitive to input/output patterns. For example, in a flash storage device, excessive repeated writes to a given block of storage eventually will destroy an ability of the given block of storage to store data. Some existing non-volatile block storage devices employ wear leveling to spread out erasures across a range of logical block addresses (LBAs) in order to avoid, or reduce, a negative impact to the non-volatile block storage devices. However, existing non-volatile block storage devices, typically, do not provide feedback to processing devices regarding ongoing health of flash cells and input/output patterns employed by the processing device.

Currently, a storage controller of a processing device submits an input/output stream according to an input/output pattern designed into a storage subsystem component of an operating system executing on the processing device. The storage subsystem component may adjust some parameters of the input/output stream, such as, for example, buffer size, or other parameters. However, the storage subsystem component does not fully adapt the input/output pattern to a current status of a non-volatile block storage device.

Some designed storage subsystem components of operating systems treat a connected non-volatile block storage device as a black box. Such storage manager components may measure a responsiveness of the connected non-volatile block storage device and may perform minimal adaptive actions, such as, for example, varying a size of buffers and/or increasing a number of threads.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a first embodiment consistent with the subject matter of this disclosure, a method is provided for communication between a storage device interface of a processing device and a non-volatile block storage device. The non-volatile block storage device may provide feedback to a storage subsystem component of an operating system executing on the processing device. The feedback may include information indicating a status of the non-volatile block storage device. In response to receiving the feedback, the storage subsystem component may change a behavior, with respect to the non-volatile block storage device, in order to avoid, or reduce, a negative impact to the non-volatile block storage device.

The feedback may include performance information and/or operational environmental information. The storage subsystem component may analyze the information included in the received feedback and may change a behavior, such as, adapting a different access pattern, changing a profile that defines a behavior of the processing device with respect to the non-volatile block storage device, changing a queuing method, changing parameters used by the queuing method, or performing or not performing another action in order to decrease a negative impact to the non-volatile block storage device.

In a variation of the first embodiment, the storage subsystem component may poll the non-volatile block storage device in order to receive the feedback. In a second variation of the first embodiment, the non-volatile block storage device may asynchronously provide feedback to the storage manager component.

In some embodiments, the storage subsystem component may determine that the non-volatile block storage device is not capable of providing the feedback to the processing device. When the storage subsystem component determines that the non-volatile block storage device is not capable of providing the feedback to the processing device, the operating system may request information about the non-volatile block storage device from a database service implemented on a remote server. The remote server may provide information including performance characteristics of the non-volatile block storage device. If the database service is unable to find a direct match with respect to the non-volatile block storage device, the remote server may provide, in response to the request from the operating system, a generic profile or may select a profile based on similarities to the non-volatile block storage device. The performance characteristics may include, but not be limited to, input/output patterns to use, queuing methods to use, input/output patterns to avoid, and queuing methods to avoid.

DRAWINGS

In order to describe the manner in which the above-recited and other advantages and features can be obtained, a more particular description is described below and will be rendered by reference to specific embodiments thereof which are illustrated in the appended drawings. Understand that these drawings depict only typical embodiments and are not therefore to be considered to be limiting of its scope. Implementations will be described and explained with additional specificity and detail through the use of the accompanying drawings.

DETAILED DESCRIPTION

Figure 1:
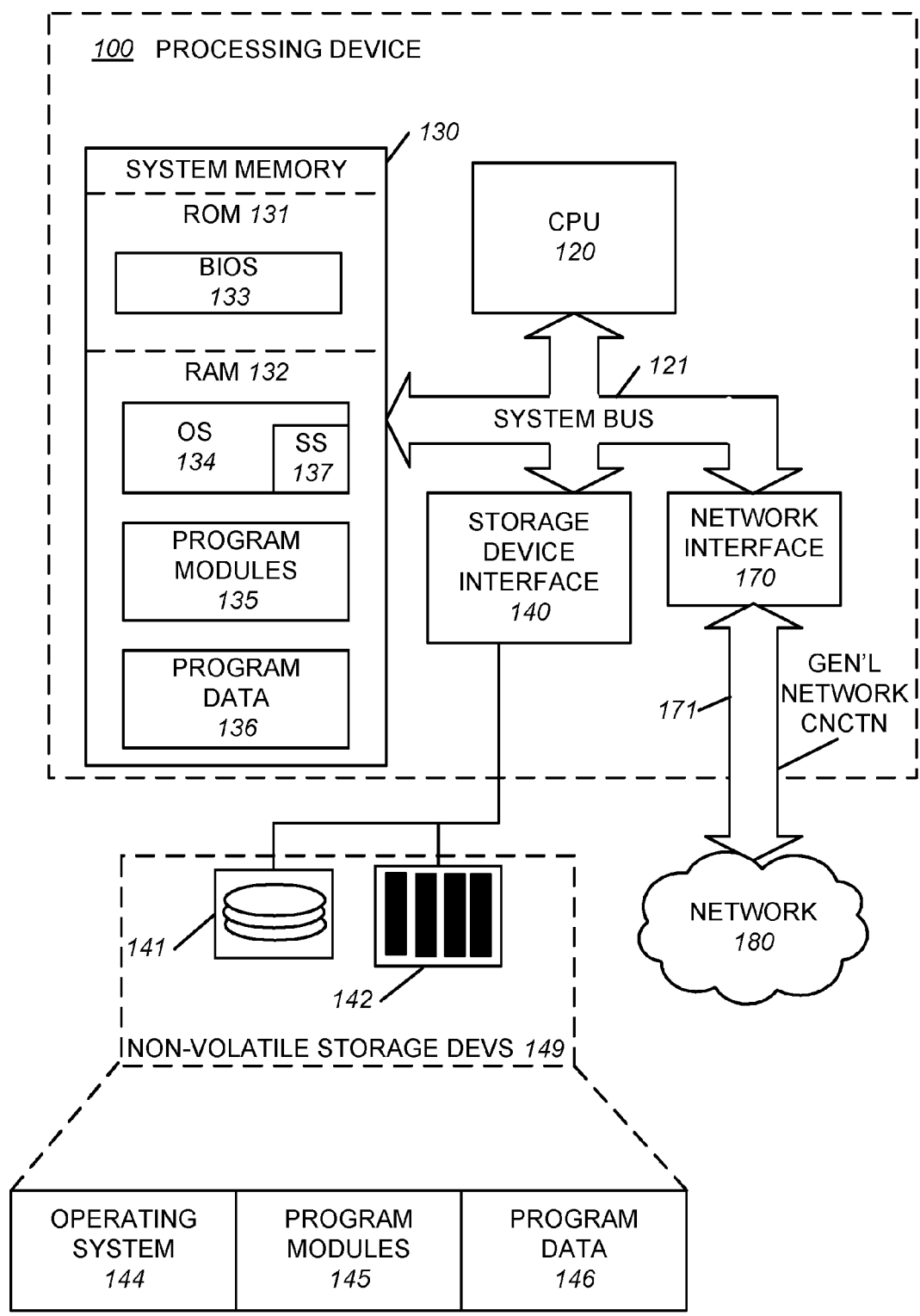
FIG. 1 is a block diagram of an exemplary processing device, which may be used to implement embodiments consistent with subject matter of this disclosure.

Embodiments are discussed in detail below. While specific implementations are discussed, it is to be understood that this is done for illustration purposes only. A person skilled in the relevant art will recognize that other components and configurations may be used without parting from the spirit and scope of the subject matter of this disclosure.

Overview

In embodiments consistent with the subject matter of this disclosure, methods and devices are disclosed, such that a non-volatile block storage device may provide information to a storage subsystem component of an operating system executing on a processing device. The information may indicate desired changes to an input/output (I/O) pattern in order to reduce a negative impact to the non-volatile block storage device, or to enhance an aspect of the non-volatile block storage device.

In a first embodiment consistent with the subject matter of this disclosure, a storage subsystem component of an operating system executing on a processing device may poll a non-volatile block storage device to obtain information about the non-volatile block storage device. In a second embodiment, the non-volatile block storage device may asynchronously provide the information to the storage manager component.

In one embodiment, the non-volatile block storage device may provide an indication for the storage subsystem component to use one of a number of predefined profiles, to which the storage subsystem component may conform when using the non-volatile block storage device. At least some of the predefined profiles may have an associated I/O pattern, such as, for example, a write pattern, to which the storage manager component may conform when communicating with the non-volatile block storage device.

In another embodiment, the predefined profile may include information for avoiding, or reducing, a negative impact on the non-volatile block storage device such as, for example, information indicating that the storage subsystem component is sending too many short data writes to the non-volatile block storage device, or other information.

The non-volatile block storage device may not be capable of providing status information, information for avoiding, or reducing, a negative impact to the non-volatile block storage device, or information for enhancing an aspect of the non-volatile block storage device. The operating system executing on the processing device may request and receive, from a database service via a network, information about the non-volatile block storage device. The information may include performance characteristics of the non-volatile block storage device, such as, for example, particular writing patterns the storage subsystem component may use when writing to the non-volatile block storage device, as well as other information.

Alternatively, the storage subsystem component may obtain performance characteristics of the non-volatile block storage device from hardcoded tables within the storage subsystem component itself. The tables may have been constructed from empirical findings while the storage subsystem component was being written.

Exemplary Processing Devices

FIG. 1 is a block diagram of an exemplary processing device 100, which may be used to implement embodiments consistent with the subject matter of this disclosure. The processing device 100 may be a personal computer (PC), a handheld processing device, or another type of processing device. Processing device 100 may include a central processing unit (CPU) 120, a system bus 121, a system memory 130, a storage device interface 140, and a network interface 170.

Storage device interface 140 may interface with non-volatile storage devices 149. Network interface 170 may interface with network 180 via a general network connection 171.

CPU 120 may include one or more conventional processors that interpret and execute instructions.

System memory 130 may include a read only memory (ROM) 131 and a random access memory (RAM) 132. ROM 131, or another type of static storage device, may store static information and instructions for CPU 120. RAM 132, or another type of dynamic storage device, may store instructions as well as temporary variables or other intermediate information used during execution of instructions by CPU 120.

ROM 131 may include firmware such as, for example, a basic input output system (BIOS) 133. BIOS 133 may include a set of routines that works with a processing device's hardware to support data transfers between various components, such as a monitor and disk drives of a processing device.

RAM 132 may include an operating system 134, program modules 135, which may include sets of instructions for CPU 120, and program data 136. Thus, CPU 120 may execute instructions stored on a tangible machine-readable medium, such as RAM 132, ROM 131, a hard disk, a compact disk (CD), a flash RAM, or other tangible machine-readable medium.

Operating system 134 may include a storage subsystem 137 for communicating with non-volatile storage devices 149 via system bus 121 and storage device interface 140.

System bus 121 may connect to CPU 120, system memory 130, storage device interface 140, and network interface 170 to permit communications there between.

Non-volatile storage devices 149 may include magnetic disk 141, a flash RAM device 142, and/or other types of non-volatile storage devices. Non-volatile storage devices 149 may store information such as, for example, an operating system 144, program modules 145, and program data 146, as well as other information.

Network 180 may be a wired or wireless network and may include a number of devices connected via wired or wireless means. Network 180 may include only one network or a number of different networks, some of which may be networks of different types. Network 180 may include a packet-switching network, a wireless network, an ATM network, a Frame Relay network, an optical network, a Public Switched Telephone Network (PSTN), a satellite network, the Internet, an intranet, other types of networks, or any combination of the above.

Figure 2:
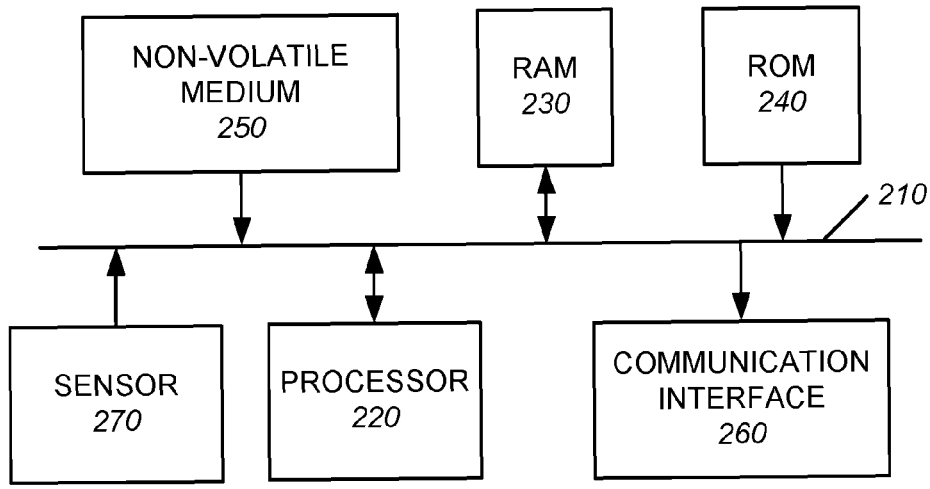
FIG. 2 is a block diagram of an exemplary non-volatile block storage device, which may be used to implement embodiments consistent with the subject matter of this disclosure.

FIG. 2 is an exemplary block diagram of one of non-volatile block storage devices 149, which may be used in embodiments consistent with the subject matter of this disclosure. Non-volatile block storage device 149 may include a bus 210, a processor 220, a RAM 230, a ROM 240, a non-volatile medium 250, a communication interface 260, and one or more sensors (sensor(s)) 270. Bus 210 may connect processor 220, RAM 230, ROM 240, non-volatile medium 250, communication interface 260, and sensor(s) 270.

Processor 220 may include one or more processors that interpret and execute instructions. RAM 230, or another type of dynamic storage device, may store instructions as well as temporary variables or other intermediate information used during execution of instructions by processor 220. ROM 240, or another type of static storage device, may store static information and instructions for processor 220. In various embodiments, ROM 240 may include instructions, or firmware, for monitoring processing device operations, with respect to non-volatile medium 250, and for providing information, or feedback, to a processing device, as previously described.

Non-volatile medium 250 may be any non-volatile medium capable of storing data in blocks, such as, for example, flash RAM, disk, or other non-volatile medium.

Communication interface 260 may be an interface for providing storage device interface 140 with access to the one of non-volatile block storage devices 149 through a programmable host controller interface which may drive a storage bus transport which carries a command protocol.

Sensor 270 may include one or more sensors for monitoring and reporting environmental conditions, such as, for example, a temperature sensor, a vibration sensor, an accelerometer, or other type of sensor. Sensor 270 may collect information regarding environmental conditions into RAM 230, non-volatile medium 250, or other dynamic storage, such that processor 220 may report the information regarding environmental conditions to a connected processing device.

Exemplary Operating Environments

Figure 3:
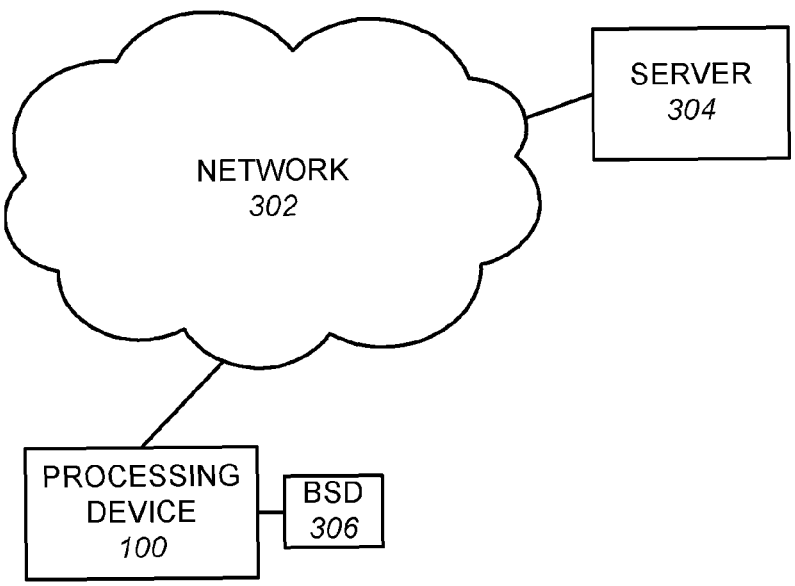
FIG. 3 illustrates an exemplary operating environment for embodiments consistent with the subject matter of this disclosure.

FIG. 3 illustrates an exemplary operating environment 300 for embodiments consistent with the subject matter of this disclosure. Operating environment 300 may include a network 302, processing device 100 connected to network 302, a non-volatile block storage device (BSD) 306 to which processing device 100 is connected, and server 304 connected to network 302.

Network 302 may be a wired or wireless network and may include a number of devices connected via wired or wireless means. Network 302 may include only one network or a number of different networks, some of which may be networks of different types. Network 302 may include a packet-switching network, a wireless network, an ATM network, a Frame Relay network, an optical network, a Public Switched Telephone Network (PSTN), a satellite network, the Internet, an intranet, other types of networks, or any combination of the above.

In one embodiment, processing device 100 may contact server 304, via network 302, to request information about BSD 306. Server 304 may provide a database service regarding non-volatile block storage devices and may respond to the request from processing device 100 with information regarding BSD 306. The information may include performance characteristics of BSD 306, writing patterns to use when writing to BSD 306, writing patterns to avoid when writing to BSD 306, and/or other information for avoiding, or reducing, a negative impact to BSD 306. Processing device 100 may receive the requested information and may use the information to more efficiently use BSD 306 and avoid, or reduce, a negative impact to BSD 306.

In some embodiments, processing device 100 may not request information from server 306 and may or may not be connected to network 302. Instead, processing device 100 may receive feedback from BSD 306. The feedback may be sent asynchronously from BSD 306, may be sent in response to receiving a poll from processing device 100, or may be provided from hard coded tables within processing device 100. The feedback may include performance characteristics of BSD 306, sensor information, statistical information regarding use of BSD 306, information regarding one of a number of predefined profiles, which BSD 306 is requesting processing device 100 to use, and/or other information. Processing device 100 may use the feedback to more efficiently use BSD 306 and/or to decrease a negative impact to the BSD 306.

Exemplary Processing

Figure 4:
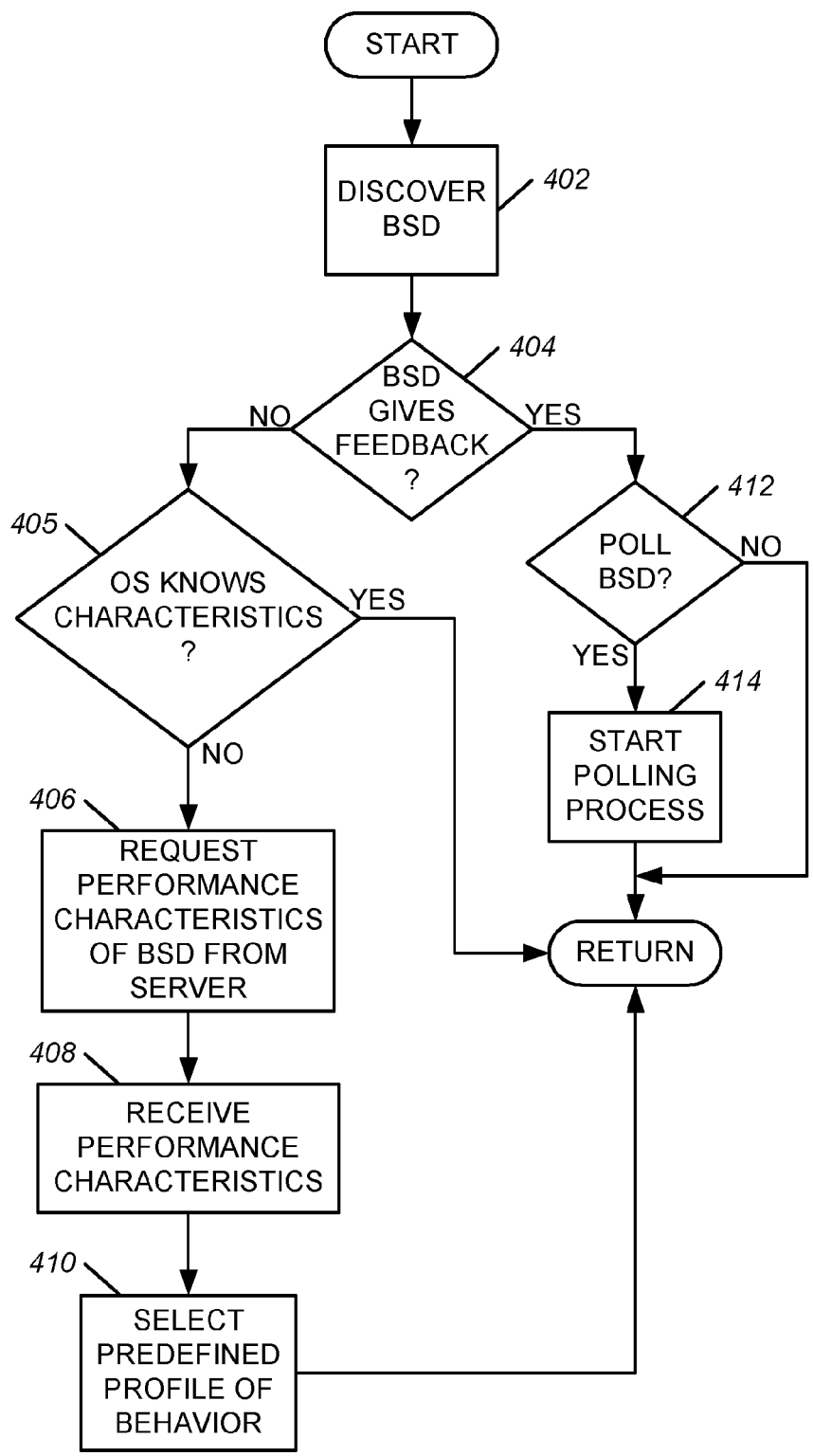
FIGS. 4 and 5 are flowcharts illustrating exemplary processes that may be preformed in a processing device in various embodiments.

FIG. 4 is a flowchart illustrating an exemplary process which may be performed by a processing device connected to a non-volatile block storage device (BSD) in embodiments consistent with the subject matter of this disclosure. The process may begin with a storage subsystem component of an operating system executing on the processing device discovering the BSD (act 402). The storage subsystem component may discover the BSD due to an electrical signal being detected from the connected BSD, a command completion being received from the BSD, or via other methods.

The storage subsystem component may then determine whether the BSD is capable of providing feedback (act 404). The storage subsystem component may make the determination based on a type of the BSD, an identifier provided by the BSD, or via other methods. If the storage subsystem component determines that the BSD is not capable of providing feedback, then the storage subsystem component may determine whether the operating system executing on the processing device has information regarding characteristics of the BSD (act 405). If the storage subsystem component determines that the operating system does have information regarding the characteristics of the BSD, then the process may be completed.

Otherwise, the storage subsystem component may request performance characteristics of the BSD from a remote server providing a database service via a network (act 406). The storage subsystem component may then receive, from the remote server, information describing BSD performance characteristics (act 408). The BSD performance characteristics may include an indication of one or more types of I/O patterns to use, an indication of one or more queuing methods to use, such as, for example, aggregation of numerous I/O operations into a single data I/O operation (assuming that the data is not transactional or sensitive), as well as other queuing methods, an indication of I/O patterns to avoid, an indication of queuing methods to avoid, and/or other information.

A memory of the processing device may have stored therein a number of predefined profiles. Each of the predefined profiles may define a behavior of the processing device when communicating with the BSD. For example, writing patterns may be associated with at least some of the predefined profiles, a queuing method may be associated with at least some of the predefined profiles, as well as other processing device behaviors. The storage subsystem component may select, as a current profile to use, one of the predefined profiles that most closely corresponds to the received performance characteristics (act 410). The process may now be completed.

If, during act 404, the storage subsystem component determines that the BSD does provide feedback, then the storage subsystem component may determine whether to poll the BSD (act 412). The determination may be made based upon a type of the BSD, an identifier provided by the BSD, or via other methods. If the storage subsystem component determines that the BSD is to be polled, then the storage subsystem component may start a polling process to poll the BSD (act 414). The storage subsystem component may poll the BSD periodically, or at irregular time intervals based upon input/output activity with the BSD. During the polling process, the BSD may provide feedback in response to receiving a poll from the processing device. The process may then be completed.

If the storage subsystem component determines that the BSD is not to be polled, then the storage subsystem component may assume that the BSD provides feedback asynchronously. The process may then be completed.

Figure 5:
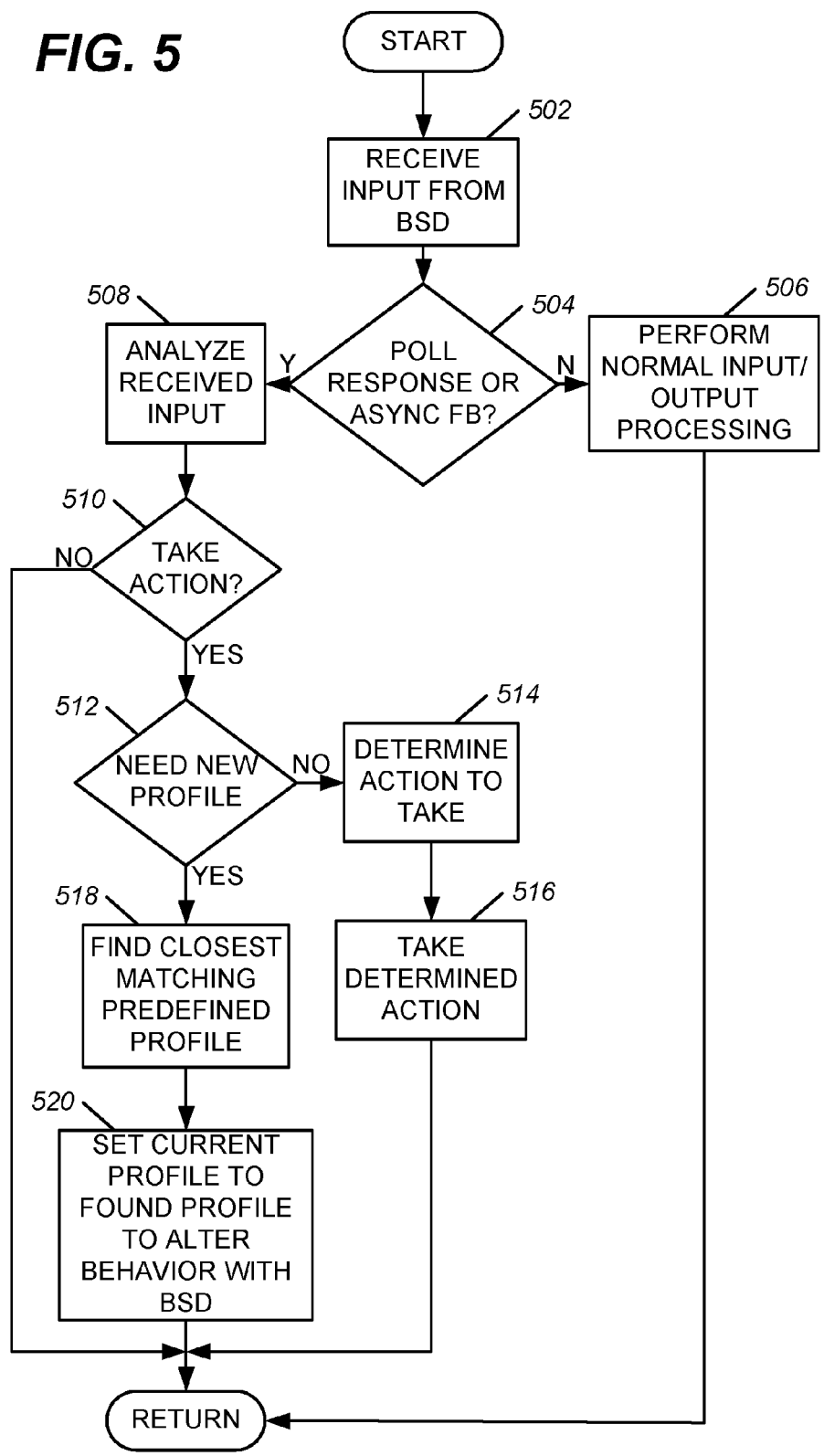

FIG. 5 is a flowchart illustrating an exemplary process which may be performed by the storage subsystem component when input is received from the BSD. The process may begin with the storage subsystem component of an operating system of the processing device receiving the input from the BSD (act 502). The storage subsystem component may then determine whether the received input is a poll response (if the processing device polls the BSD) or is asynchronously provided feedback from the BSD (if the processing device does not poll the BSD, but the BSD does provide feedback) (act 504).

If the storage subsystem component determines that the received input is not a poll response or asynchronously provided feedback, then the storage subsystem component may assume that the input from the BSD is related to input/output with respect to the BSD and the processing device may continue to perform input/output processing unchanged (act 506). The process may then be completed.

If, during act 504, the storage manager component determines that the input is a poll response or an asynchronously provided feedback, then the storage subsystem component may analyze the received input (act 508). The storage subsystem component may determine whether to take any action based upon the received input (act 510).

The storage subsystem component may determine whether to take action based upon content of the received input as well as a current status of the storage manager component. The current status of the storage subsystem component may include, for example, a current predefined profile being used, a particular I/O pattern being used, a queuing method being used, whether direct memory access (DMA) with respect to an input/output controller of the BSD is enabled or disabled, and/or other information. The content of the received input may include information such as statistical information and/or performance-related information, such as, for example, a number of writes per write request (also known as write amplification), a number of short data writes performed over a particular time interval, a number of data writes performed over particular logical block address (LBA) ranges over a particular time interval, as well as other statistical or performance-related information.

The content of the received input may also include operational environmental data detected by one or more sensors, as well as other or different environmental data. The operational environmental data may include, for example, temperature data, vibration-related data, accelerometer-related data, and other data. In one embodiment, the BSD may determine an approximate amount of time since the BSD was last used and may include information in the feedback relating to the approximate amount of time. In one implementation, the BSD may determine the approximate amount of time by measuring an amount of electrical charge remaining at memory cells of one or more particular LBAs of the BSD. Published U.S. Patent Application 2007/0233609 to Bovee et al. discloses one method of determining a passing of an approximate time period based on measuring an amount of charge remaining at one or more memory cells of one or more LBAs of a BSD. In other embodiments, the BSD may determine a passing of an approximate time period via other methods.

In some embodiments, the feedback may include an indication of one of a number of predefined profiles, each of which may define a respective behavior of the processing device regarding input from and/or output to the BSD. If the BSD is unable to find a predefined profile that directly matches a desired respective behavior, the BSD may include in the feedback an indication of one of the predefined profiles that most closely defines a desired behavior.

If, during act 510, the storage subsystem component determines that no action is taken, then the process may be completed. Otherwise, the storage subsystem component may determine whether to conform to a different predefined profile (act 512).

If the storage manager component determines that the predefined profile is not to be changed, then the storage subsystem component may determine which of a number of actions to take based on a current status of the storage manager component and the received feedback from the BSD (act 514).

In some embodiments, the feedback may include an alert, which may provide information concerning a critical condition within the BSD, such as, a critical performance-related threshold having been crossed, or reached, a critical sensor-related threshold having been crossed, or reached, or other information. If the received feedback includes an alert, then, during act 514, the storage subsystem component may determine an action to take based upon the received alert.

The storage subsystem component may then take the determined action (act 516). The determined action may include changing a writing pattern with respect to the BSD, changing a queuing method with respect to outputting to the BSD, disabling or enabling direct memory access (DMA) with respect to input from or output to the BSD, adjusting one or more parameters of a queuing method used by the processing device to output data to the BSD, informing a user to stop using the BSD, or a different action. The process may then be completed.

If, during act 512, the storage subsystem component determines that the profile is to be changed, then the storage subsystem component may determine which of the number of predefined profiles most closely matches, or addresses, a status of the BSD, as indicated by the provided feedback (act 518). The processing device may then set a current profile to the found profile to alter a behavior of the storage subsystem component with respect to the BSD (act 520). The process may then be completed.

Figure 6:
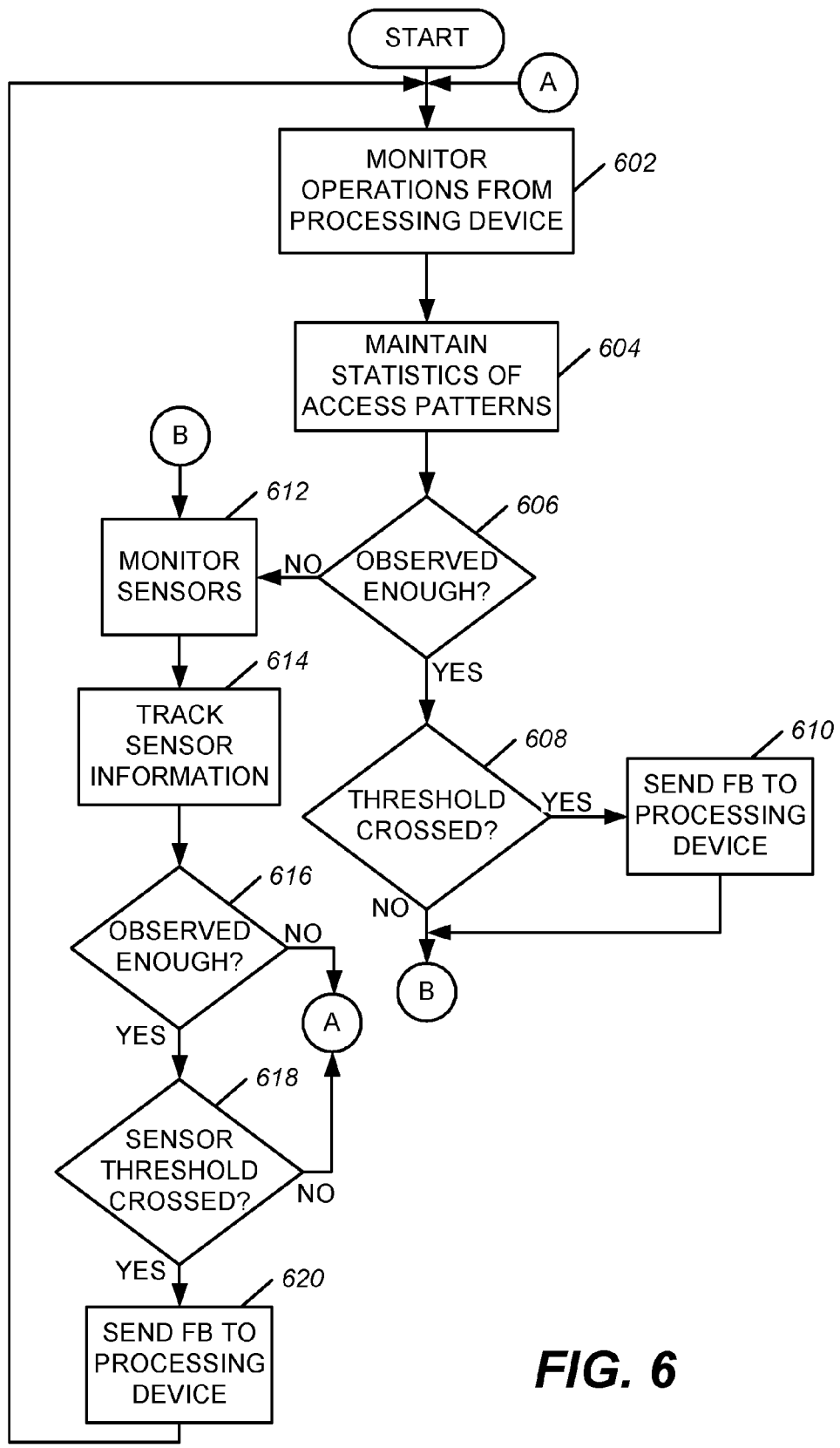
FIG. 6 is a flowchart illustrating a process that may be performed in a non-volatile block storage device in various embodiments.

FIG. 6 is a flowchart illustrating an exemplary processing which may be performed by a BSD in embodiments consistent with the subject matter of this disclosure. Instructions for performing acts illustrated by the flowchart may be included in firmware stored within a ROM, or other static storage, of the BSD.

The process may begin with the BSD monitoring operations from the processing device, such as, for example, input and output operations (act 602). The BSD may maintain statistics and histograms with respect to I/O patterns of the processing device, such as, for example, read patterns and write patterns (act 604). The BSD may, accomplish this by attempting to match the read patterns and the write patterns to a predetermined template and by collecting statistical information which may approximately describe a random process of I/O requests. Examples of the statistical information, assuming a predefined distribution, such as, for example, a normal distribution, or other distribution, may include, but not be limited to, a density of small data writes to a region of LBAs, a frequency of small data writes, and a portion data writes that are excessively long. In some embodiments, the firmware of the BSD may include hard-coded descriptions of random distributions. In other embodiments, the firmware may include instructions for creating descriptions of the random distributions when needed.

The BSD may then determine whether a sufficient quantity of operations from the processing device have been observed, such that a certain degree of accuracy may be achieved (act 606). If the BSD determines that the quantity of operations observed from the processing device is sufficient, the BSD may determine whether a threshold has been crossed, or reached (act 608). For example, first generation consumer flash disk are designed for long sequential writes and size aligned random reads. If the BSD includes a first generation consumer flash disk and the BSD observes that the processing device employs an excessive load of small random writes to the flash disk (which will cause the flash disk to perform write operations more slowly and to wear out prematurely), then the BSD may report that an observed frequency and size of writes from the processing device are crossing a safe threshold.

If the BSD determines that a threshold has been crossed, or reached, then the BSD may provide feedback to the processing device (act 610). As previously mentioned, the feedback may include statistical information, an indication of a predefined profile, an indication of a write pattern, an indication of a queuing method, or other information that the processing device may use to adapt behavior with respect to the BSD to reduce a negative impact to the BSD.

After determining that a threshold has not been crossed, during act 608, or after sending feedback to the processing device, during act 610, the BSD may monitor information regarding one or more sensors (act 612). The BSD may keep track of the monitored information from the one or more sensors (act 614). The BSD may then determine whether sufficient information from the one or more sensors has been observed, such that a certain degree of accuracy may be achieved (act 616). If the BSD determines that an amount of information observed, with respect to the one or more sensors, is not sufficient, then the BSD may repeat act 602. Otherwise, the BSD may determine whether a sensor threshold has been crossed (act 618). For example, a temperature sensor may report that a temperature is too high, or a vibration sensor may report that an amount of vibrations sensed is too high and/or too severe. If, during act 618, the BSD determines that a sensor threshold has been crossed, then the BSD may send feedback, including information indicating that a sensor threshold has been crossed, to the processing device (act 620). The BSD may then repeat act 602.

Miscellaneous

Although some of the above-described embodiments illustrate a BSD providing feedback to a storage subsystem component of a processing device, which may be employed to adapt behavior to reduce a negative impact to the BSD, the BSD and/or the storage subsystem component may further adapt their respective behaviors. For example, the storage subsystem component may monitor a response time of the BSD and, upon observing excessively long response times, the storage subsystem component may adapt by changing a predefined profile, a write pattern, a read pattern, disabling or enabling use of DMA with respect to the BSD, changing a size of write buffers, changing a queue depth, changing a queuing method, or making other changes.

The BSD is more intimately aware of performance characteristics of the BSD than the processing device and may adapt behavior accordingly by taking actions including, but not limited to, aggregating short data writes from the processing device into long data writes, or turning off a portion of the BSD based on information reported by the one or more sensors, such as, for example, temperature information or other information.

Further, the information provided in the feedback from the BSD may be in a previously agreed-upon format, such that heterogeneous processing devices may be capable of using the BSD and adapting their respective behavior based upon the feedback provided by the BSD.

CONCLUSION

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Other configurations of the described embodiments are part of the scope of this disclosure. For example, in other embodiments, an order of acts performed by a process, such as the processes illustrated in FIGS. 4-6 may be different, may be performed in a different order, and/or may include additional or other acts.

Accordingly, the appended claims and their legal equivalents define embodiments, rather than any specific examples given.

We claim as our invention:

1. A method for using a non-volatile block storage device, the method comprising:
   monitoring write operations requested by a host processing device; and
   providing feedback from the non-volatile block storage device to an operating system component of the host processing device based on the monitored operations, the feedback including an indication of how the operating system component of the host processing device is to write to the non-volatile block storage device.

2. The method of claim 1, wherein the feedback provided to the operating system component of the host processing device also includes information regarding an operational environment of the non-volatile block storage device.

3. The method of claim 1, wherein providing the feedback includes:
   providing the feedback to the host processing device in response to a polling operation of the host processing device for the feedback from the non-volatile block storage device.

4. The method of claim 1, wherein the indication indicates:
   a queuing method to be used by the operating system component of the host processing device to write to the non-volatile block storage device.

5. The method of claim 4, wherein the indication indicates:
   a parameter for the queuing method to be used by the operating system component of the host processing device to write to the non-volatile block storage device.

6. The method of claim 1, wherein the feedback also includes information indicating one or more ways that are not to be used by the operating system component of the host processing device to write to the non-volatile block storage device.

7. The method of claim 1, wherein the indication indicates a pattern with which the non-volatile block storage device is to write to the non-volatile memory.

8. A host processing device, comprising:
   at least one memory and at least one processor that are respectively configured to store and execute instructions for causing the host processing device to perform operations, the operations including:
      receiving, from a non-volatile block storage device, information regarding use of the non-volatile block storage device by the host processing device, the received information including an indication of how the operating system is to write to the non-volatile block storage device; and
      in response to the received information, adapting how the host processing device writes to the non-volatile block storage device.

9. The host processing device of claim 8, wherein the received information includes performance characteristics of the non-volatile block storage device.

10. The host processing device of claim 8, wherein the operations further include:
    modifying an input/output pattern used by the operating system executing on the host processing device to write data to the non-volatile block storage device based on the received information.

11. The host processing device of claim 8, wherein the operations further include:
    receiving operating environmental information from the non-volatile block storage device; and
    changing input/output patterns of the operating system executing on the host processing device based on the received environmental information.

12. The host processing device of claim 8, wherein the operations further include:
    enabling or disabling one or more features of an input/output controller of the host processing device based on the received information.

13. A computing device, comprising:
    at least one memory and at least one processor that are respectively configured to store and execute instructions for causing the computing device to perform operations, the operations including:
       receiving, by software executing on the computing device, information from a non-volatile block storage device, the received information including an indication of how the software executing on the computing device is to write data to the non-volatile block storage device, and the received information being generated by the non-volatile block storage device based on use of the non-volatile block storage device by the computing device; and
       changing, based on the received information, how the software executing on the computing device writes data to the non-volatile block storage device.

14. The computing device of claim 13, wherein the received information includes performance characteristics of the non-volatile block storage device.

15. The computing device of claim 13, wherein the software executing on the computing device device is an operating system of the computing device device.

16. The computing device of claim 13, wherein the operations also include:
    modifying an input/output pattern used by the software executing on the computing device to write data to the non-volatile block storage device based on the received information.

17. The computing device of claim 13, wherein the operations also include:
    polling the non-volatile block storage device; and
    receiving the information from the non-volatile block storage device in response to the polling.

18. The computing device of claim 13, wherein the operations also include:
    enabling or disabling one or more features of an input/output controller of the computing device based on the received information.

19. The computing device of claim 13, wherein the indication indicates:
    a queuing method to be used by the software executing on the computing device to write data to the non-volatile block storage device.

20. The computing device of claim 13, wherein the indication indicates:
    a parameter for the queuing method to be used by the software executing on the computing device to write data to the non-volatile block storage device.

* * * * *